United States Patent [19]

Schmidt et al.

[11] Patent Number: 5,245,221
[45] Date of Patent: Sep. 14, 1993

[54] SYSTEM FOR JETTED TUBS AND APPARATUS THEREFOR

[75] Inventors: Adam R. Schmidt, Leonardo, N.J.; Gregory W. Bailey, LaMesa, Calif.

[73] Assignee: American Standard Inc., New York, N.Y.

[21] Appl. No.: 875,557

[22] Filed: Apr. 27, 1992

Related U.S. Application Data

[63] Continuation of Ser. No. 417,233, Oct. 23, 1989, abandoned.

[51] Int. Cl.$^5$ .............................................. H02B 1/00
[52] U.S. Cl. .................................. 307/112; 307/116; 4/541.1; 361/622
[58] Field of Search .................. 307/112, 116, 118; 361/395, 412, 413, 415, 424; 4/541.1, 541.2, 541.3, 541.4, 541.5, 541.6

[56] References Cited

U.S. PATENT DOCUMENTS

| | | | |
|---|---|---|---|
| 3,721,746 | 3/1973 | Knappenberger | 361/424 |
| 3,816,911 | 6/1974 | Knappenberger | 361/424 |
| 4,169,923 | 10/1979 | Weaver | 4/544 |
| 4,564,962 | 1/1986 | Castleberry et al. | 4/541.2 |
| 4,716,605 | 1/1988 | Sheperd et al. | 4/541.2 |
| 4,742,456 | 5/1988 | Kamena | 4/541.2 |
| 4,744,006 | 5/1988 | Duffield | 361/413 |

*Primary Examiner*—Jeffrey A. Gaffin
*Attorney, Agent, or Firm*—Elaine B. Robinson; Ann M. Knab

[57] ABSTRACT

The present invention discloses a control box for enclosing at least one main control circuit electrically connected to at least one or more electrically-controllable function providing operating units mounted through or operably connected to a jetted tub. The control box in general comprises a high voltage compartment and a low voltage compartment, separated by a partition having at least one access opening to permit electrical connection of at least one control unit to a high voltage terminal block installed in the high voltage compartment. Another aspect of the present invention concerns a control system for use with the jetted tub having one or more function providing operating units electrically connected to the control system. The control system comprises a control box having high and low voltage compartments separated by a partition. The high voltage compartment has a high voltage terminal block mounted therein which is connectable to a power source, while the low voltage compartment has at least one main control circuit mounted therein. The main control circuit is electrically connected to the high voltage terminal block through the partition, and is capable of receiving one or more auxiliary control circuits to provide control over the operation of one or more function providing operating units. The control system also includes a switch which is connected to the main control circuit so as to permit the operation of at least one of the function providing operating units installed on the jetted tub.

8 Claims, 10 Drawing Sheets

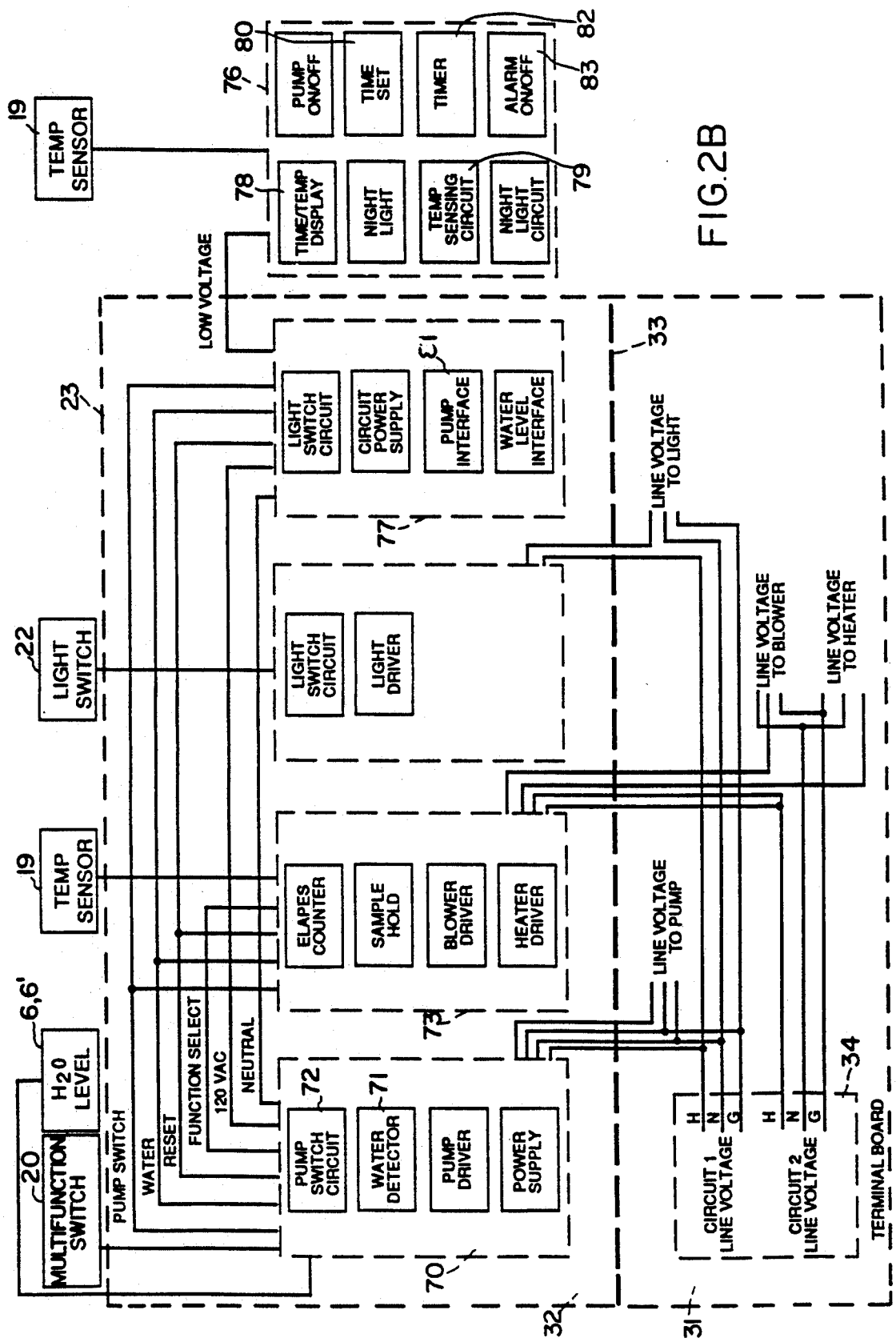

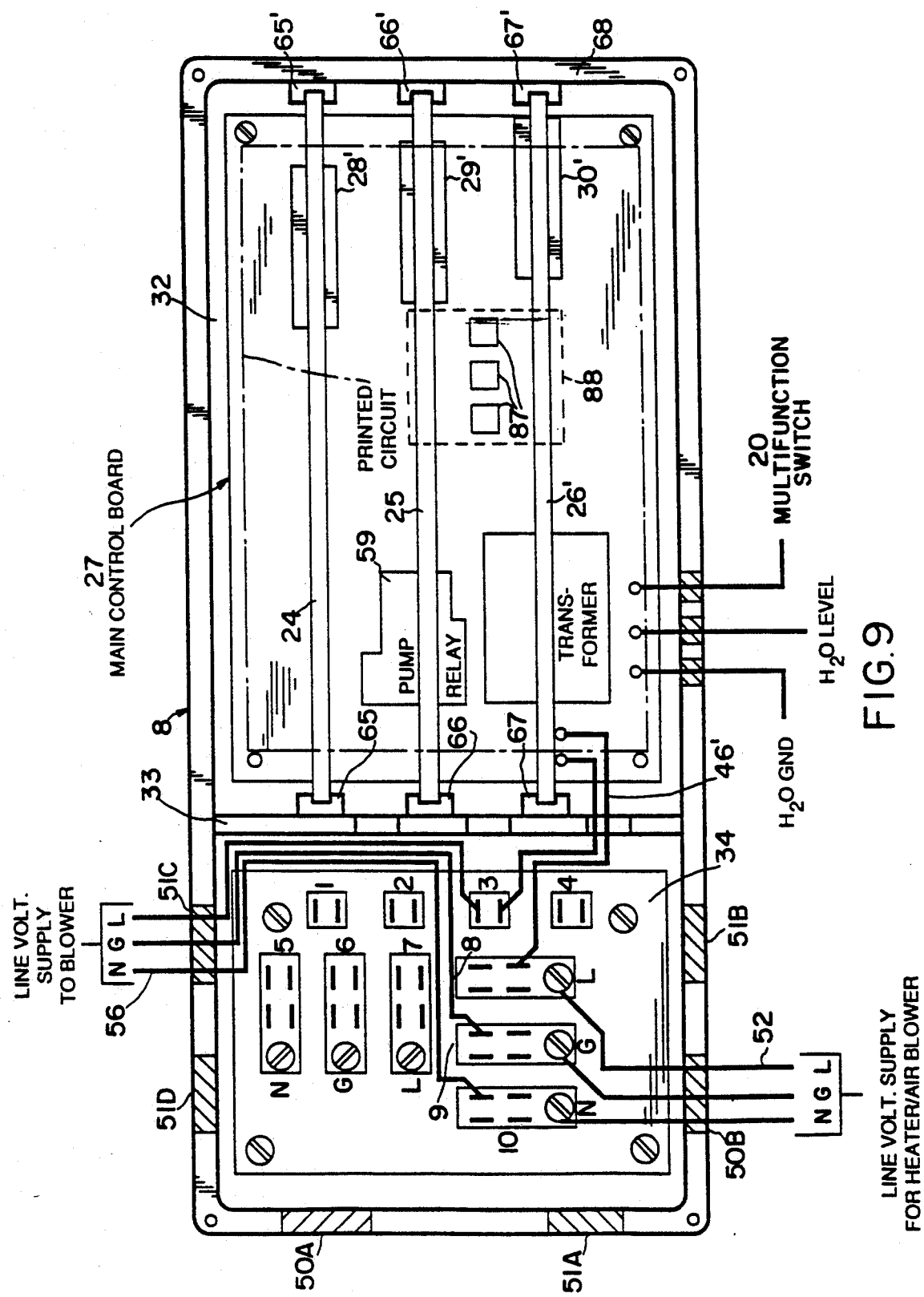

SYSTEM FOR JETTED TUBS AND APPARATUS THEREFOR

This is a continuation of application Ser. No. 07/417,233, filed on Oct. 5, 1989 now abandoned.

BACKGROUND OF THE DISCLOSURE

1. Field of the Invention

The present invention relates generally to a control system for jetted tubs, and more particularly, to a unitary control box and an expandable control system in which it is used for electrically connecting and controllably operating one or more function providing operating units mounted to a jetted tub during or after the installation of the basic control system to the jetted tub.

2. Description of Prior Art

In recent years, jetted tubs, such as whirlpool baths and soaking tubs as well as spas, have been commercially accepted by the public. Jetted tubs, including spas and baths, incorporate a control system for electrically controlling a variety of jetted tub mounted components, providing for various functions. Among these function providing components, are means to heat and control water temperature; means for circulating water with or without entrained air; means to control water level in the tub or spa; means to provide white or colored light in the tub; and any additional functions which the user may desire. Generally, one or more of these functions, not furnished as original equipment at the time of installation, can only be added as separate units, but only at considerable expense to the user.

A unitized, compactly designed control system for jetted tubs, that includes a basic operational system which can be expanded to include a variety of one or more optional functions after installation, generally is not available.

Accordingly, it is a primary object of the present invention to provide a control system for a jetted tub in which one or more optional functions can be electrically connected as an integral part of its basic control system, either prior to its installation, during its installation, or after its installation, without the necessity for removal or replacement of the original control system for the jetted tub.

Another object of the present invention is to provide a control system for a jetted tub which includes a main control circuit having at least one function.

Another object of the present invention is to provide, in a control system for a jetted tub, apparatus which includes a control box having a main control circuit, and has provisions for electrically connecting thereto, at least one or more additional function providing operating units which may be operated either from the jetted tub or remote therefrom.

A further object of the present invention is to provide a control box of unitary design having a partition separating high and low voltage compartments, wherein the high voltage compartment contains power supply/distribution apparatus to be connected with at least one function-providing operating unit coupled to the jetted tub, and the low voltage compartment contains a low voltage apparatus for controlling the operation of the one or more operating units, from either the jetted tub itself or remote therefrom.

Another object of the present invention is to provide a unitary control box having high and low voltage compartments, with provisions in the low voltage compartment for expanding the number of functions of the jetted tub, by (i) mounting additional function providing operating units to a jetted tub, and (ii) simply plugging into a main control circuit, one or more auxiliary control circuits, each having control circuitry for electrically controlling (i.e. operating) one or more of the additional function providing operating units coupled to the jetted tub.

Another object of the present invention is to provide a control box of unitary design which includes a partition separating high and low voltage compartments.

A further object of the present invention is to provide a control system for a jetted tub and apparatus therefor which is compact in design, which requires a minimum of electrical wiring, and which is cost and labor effective to install.

SUMMARY OF THE INVENTION

From one of the broader aspects of the present invention a unitary control box is provided for enclosing at least one main control circuit which is electrically connected to at least one or more electrically controllable function providing operating units mounted to a jetted tub. In general, the unitary control box comprises a high voltage compartment and a low voltage compartment with a partition formed in the control box to separate the high and low voltage compartments. The high voltage compartment has at least one input access opening and at least one output access opening for passing high voltage conductors therethrough. The high voltage compartment also has a means for mounting therein a high voltage terminal block. The high voltage terminal block is electrically connectable to a power source and at least one electrically controllable function providing operating unit. The low voltage compartment has at least one access opening formed therein, is adapted for mounting at least one main control circuit therein, and is capable of receiving low voltage conductors to electrically connect to a switch means so as to operate the electrically controllable function providing operating unit. The partition between the high and low voltage compartments has at least one access opening formed therein to permit the electrical connection of the main control circuit to the high voltage terminal block. In addition, a cover is provided for placement over the high and low voltage compartment for a variety of environmental reasons.

In the preferred embodiment, the low voltage compartment is of suitable dimensions to permit the mounting of a main control board substantially parallel with respect to the bottom panel of the low voltage compartment. In addition, the height-wise dimensions of the low voltage compartment are such so as to permit the electrical interfacing of one or more auxiliary control boards to the main control board, in a substantially perpendicular orientation. In addition, means are provided within the low voltage compartment to slidably receive the auxiliary control boards when interfaced with the main control board. In addition, the cover panel is provided with an optically transparent window for viewing analyzer lights used to indicate one or more functions realized on the main and/or auxiliary central boards, while enclosing both the high voltage and low voltage compartments in an environmentally sealed manner.

As a result of the control box of the present invention, it is now possible to provide high line voltages to a single control box, in which all necessary control circuitry for controlling the operation of a variety of function providing operating units for the jetted tub, can be contained, and therewhile meet Underwriter Laboratories' (U.L.) approval.

Another aspect of the present invention concerns a control system for use with the jetted tub having one or more function providing operating units electrically connected to the control system. In general, the control system comprises a control box, a terminal block, at least one main control circuit, and an operating means.

The control box has a high voltage compartment and a low voltage compartment, between which a partition is disposed for separating the high and low voltage compartments. The terminal block is mounted in the high voltage compartment, and is adapted to be connected to a power source. The terminal block also has output voltage conductors for electrically connecting one or more of the function providing operating units to the terminal block.

The main control circuit is mounted in the low voltage compartment and is electrically connected to the terminal block. In general, the main control circuit is capable of receiving one or more auxiliary control circuits to provide control over the operation of one or more of the function providing operating units. The operating means on the other hand, is electrically connected to the main control circuit so as to permit the operation of at least one of the function providing operating units for the jetted tub.

In the preferred embodiment, the main control circuit comprises a main control circuit board bearing a printed circuit by which it is capable of carrying out at least one main control function for controlling the operation of at least one of the function providing operating units, in particular the pump operation. Accordingly, the main control circuit board is capable of receiving one or more auxiliary control circuit boards and to establish an interface therebetween so as to provide auxiliary control function capabilities to other function providing operating units installed to the jetted tub.

In the preferred embodiment, the auxiliary functions include providing forced air into the tub water supply lines to provide aerated jet streams to the tub for soothing whirlpool action. Another auxiliary function includes providing heating and timing capabilities for heating the tub water. Another auxiliary function includes providing illumination to the tub water for aesthetic qualities. Yet another auxiliary function is the provision of remote control and display capabilities of the various basic and auxiliary functions of the jetted tub, that is, independent of all operating switches provided directly on the deck surface of the tub itself.

As a result of the control system of the present invention, a jetted tub equipped with the control system of the present invention, can initially be purchased and installed with only water level sensing and pump operation control capabilities. Thereafter, when the jetted tub owner desires to expand the jetted tub functions, he or she may then choose to simply have the respective operating units mounted to the installed tub, and simply plug in the corresponding auxiliary control circuit board in order to expand the basic control system to provide control capabilities over the added on function providing operating units.

BRIEF DESCRIPTION OF THE DRAWINGS

FIG. 2B is a diagrammatical plan view of the high and low voltage control box illustrating the electrical connections between the high voltage compartment and the printed circuit boards mounted in the low voltage compartment and operably connected to the control means;

FIG. 9 is a top plan view of the unitary control box with at least one auxiliary printed circuit showing an alternate embodiment of the invention.

DETAILED DESCRIPTION OF THE PREFERRED EMBODIMENT

In general, the present invention is applicable to all types of jetted tubs, including whirlpool bathtubs, spas, therapeutic tubs, and the like. However, for purposes of illustration only, the general concepts and principles of the present invention are herein illustrated in a whirlpool bath tub. However, as used hereinafter and in the claims, the term "jetted tub" shall be understood to include whirlpool baths, spas, therapeutic tubs, and other sorts of liquid-containing jetted vessels in which humans immerse themselves for a variety of reasons.

Figure 1:
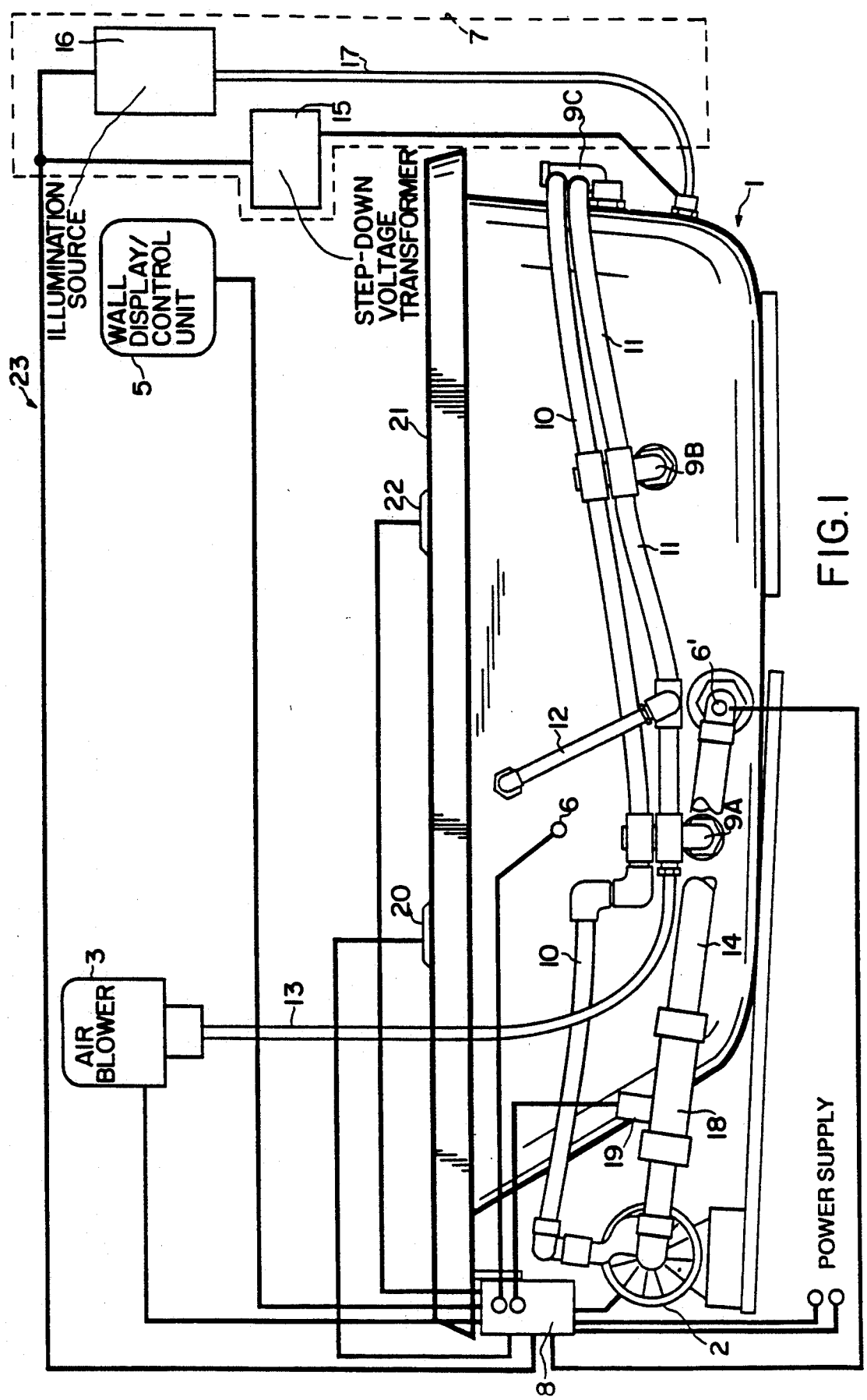
FIG. 1 is a view in side elevation of a jetted tub illustrating a control system which includes a control box electrically connected to at least one or more of the function providing operating units of the jetted tub, so that the operating units can be either from the tub or remote therefrom.

FIG. 1 illustrates a jetted whirlpool bath tub 1 in which various function providing apparatus, i.e. pump 2, heater 18, air blower 3, temperature sensor 19, wall display/control unit 5, water level sensors 6, 6' and tub illumination means 7, are electrically connected to a control box 8 having control circuitry and other electrical apparatus which will be described in detail hereinbelow.

In the jetted tub of FIG. 1, pump 2 provides forced water to the jets 9A, 9B, and 9C through a water supply line 10. Each jet has a venturi nozzle which is provided with a stream of air via air-supply line 11, so as to mix in the venturi nozzle with the water supplied from water supply line 10, to provide aerated water to the tub in the form of jet streams. Air is provided to the water supply lines 10 in one of two ways. One way involves the use of air intake line 12 which is ported to the air-supply line 11 on one of its ends, and is vented through the tub wall to the open atmosphere on its other end. Thus as water is forced through the supply line 10 by the pump, and is forced out through the venturi nozzles 9A, 9B, and 9C, air is drawn into the water to provide aerated water from the jets, in a manner known in the art. The other way to provide air to mix with the jetted water, is forcing air into the air supply line 11 using an air blower unit. As illustrated in FIG. 1, the air blower unit is schematically represented by block 3, and the forced air from the unit is provided to the air supply line 11 by way of feed line 13. Water jetted into tub 1, is drawn from the tub by way of a return line 14 which is connected to the intake side of pump 2.

In order to ensure the pump 2 is inoperable until the tub 1 is filled with a sufficient amount of water, water level sensors 6 and 6' are mounted in the wall of tub 1 at appropriate yet different water levels in tub 1 as shown in FIG. 1. As will be described in greater detail hereinafter, the pump 2 is rendered operable only when water in the tub covers both water level sensors 6 and 6', to provide a safety feature to the tub, especially when the pump is being operated while the tub water is draining.

To provide illumination of the water in the jetted tub, tub illumination means is installed in the wall of the jetted tub 1. As illustrated in FIG. 1, the illumination means 7 can be a low voltage incandescent lamp installed through the tub wall, and powered by a low voltage which has been transformed from a 110 line voltage, using a step-down voltage transformer 15 known in the art. Alternatively, a source of illumination 16 can be generated from a 110 line voltage, and then using a fiber optic cable 17 or light pipe coupling the illumination source 16 and an aperture in the wall of the jetted tub, the illumination can be delivered to the water therein.

In order that the tub water can be maintained at desired temperatures and in a user-controllable manner, an electric heater 18 is provided in the return line 14 as shown in FIG. 1, along with a temperature sensor 19 installed in proximity therewith, in a manner known in the art.

While a jetted tub user is in the jetted tub described above, he or she can operate the pump 2 (i.e. water jet function) and the air blower unit 3 using a multi-function switch or operating means 20, preferably mounted on the deck portion 21 of the tub. In the preferred embodiment, this multi-function switch means 20 is realized as a touch plate, and a sequentially stepping "capacitance sensing" circuit available from Sensatron Inc. of San Diego, Calif.

Also, an on/off switch 22 is mounted on the deck portion 21 of the tub to provide a means to operate the tub illumination means 7. In the preferred embodiment, the on/off switch 22 is realized as capacitance sensing switch of the type available, for example, from Sensatron Inc of San Diego, Calif.

In addition to providing on the jetted tub itself, means for controlling the various function providing operating units, the jetted tub of FIG. 1 is also provided with the remote display control unit 5 installed away from the tub 1, preferably on the wall of the room in which the jetted tub is installed. Preferably, this remote control unit 5 includes a built-in photo-electric based nightlight, a clock unit, and visual display for displaying time and the temperature of the tub water. The remote control unit 5 also includes switching circuitry to operate the whirlpool functions of the jetted tub 1 in a remote fashion, and set the time duration of pump operation. These features will be described in greater detail hereinafter.

All of the operating units described above including pump 2, blower unit 3, tub light units 7, water level sensors 6, 6', tub water heater 18, water temperature sensor 19, deck mounted switches 20 and 22, and remote control unit 5, are connected to the control box 8 of the present invention, using electrical conductors and connectors, known in the art. The control box 8, along with its power distribution apparatus and control circuitry which will be described in greater detail hereinafter, comprise the control system 23 of the jetted tub 1, and provide the user flexible control over the operation of the operating units installed on the jetted tub 1.

In accordance with the principles of the present invention, all of the above-described function providing apparatus can be installed on the jetted tub 1 at the time of initial installation or at any time thereafter, without having to replace or modify the basic control system 23. Instead, by merely installing the additional function providing apparatus to the tub, and adding one or more additional control circuit boards as will be described in detail below, the desired "tub function" can be quickly and simply added. This modular, expandable construction of the control system 23 of the present invention, will now be described in detail below.

Figure 2A:
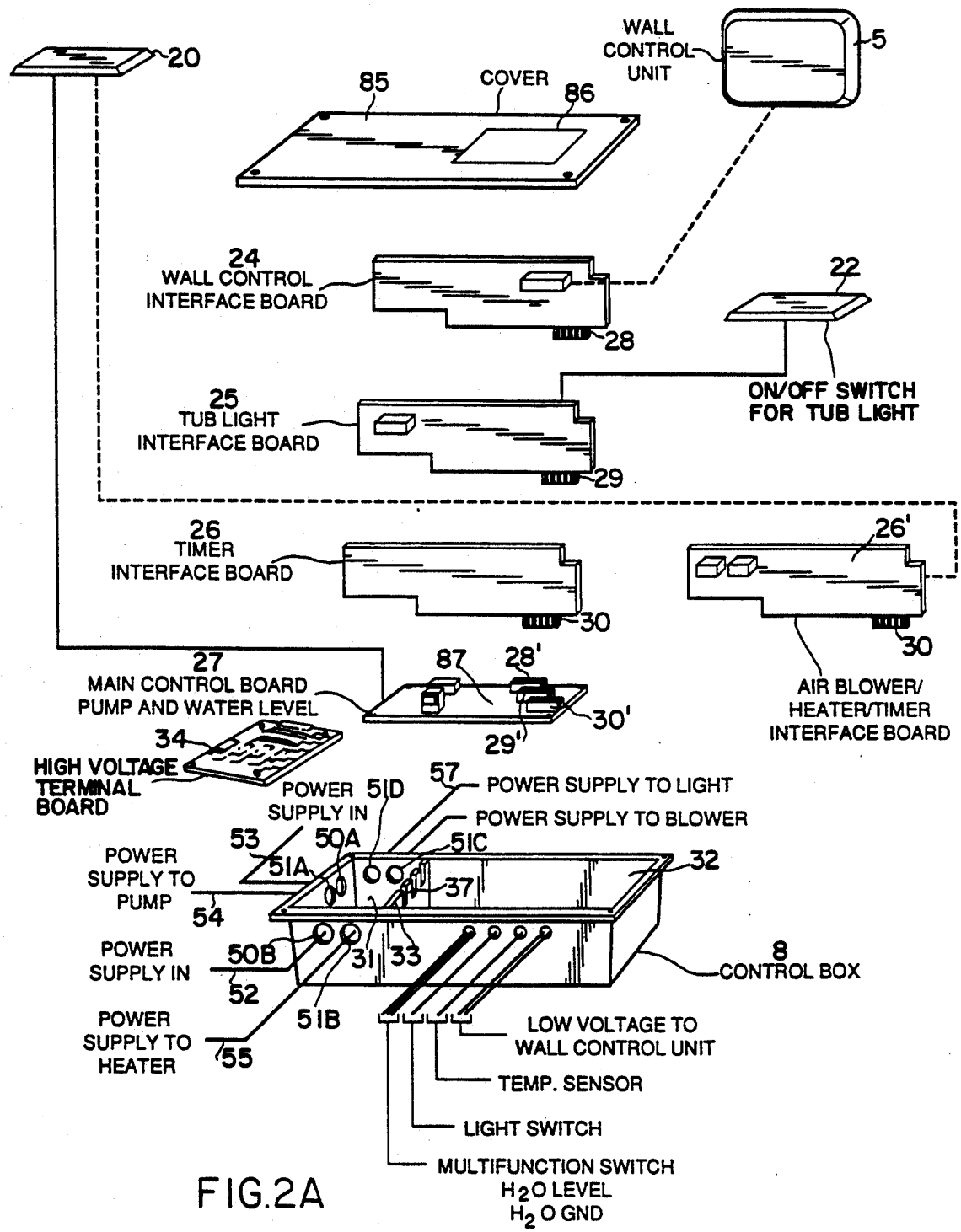
FIG. 2A is an exploded isometric view illustrating the control box, high voltage terminal board and main control circuit board with various auxiliary control circuit boards, employed in operating one or more operating units connected to the jetted tub.

Referring now to FIG. 2A, the unitary control box 8 is shown in exploded view, wherein the control box 8 is populated with various auxiliary printed circuit boards 24, 25, 26 and 26' that interface with a main control board 27, which when taken together comprise, in general, the control system 23 of the present invention. The main control board 27 carries a basic control circuit for controlling the operation of the pump 2 and water level sensors 6, 6', both generally known in the art. Each auxiliary printed circuit board, on the other hand, carries a separate control circuit for a particular auxiliary function-providing operating unit, such as for example, the air blower 3, tub light unit 7, timer/water heater 18, or remote display/control unit 5. The auxiliary control circuits indicated generally by 24, 25 and 26 (26') are known in the art and each interfaces with the main control circuit 27 through male and female multi-pin connectors pairs 28, 28', 29, 29' and 30, 30', respectively. Notably, auxiliary control circuit 25 preferably employs capacitance level sensing and touch control technology, in a manner similar to main control circuit 27, for use in controlling the operation of the pump 2.

Unitary control box 8, preferably made of a moldable plastic material such as polyvinyl chloride, includes a line or high voltage compartment 31, and a low voltage compartment 32, which are separated from each other by a partition or wall 33. The high voltage compartment 31 has mounted therein a terminal block or board 34, shown in top plan view in FIGS. 5-9, in side elevation in FIGS. 3 and 4, and in perspective in FIG. 2A. Terminal board 34 is made of a non-conductive material on which a plurality of high voltage conductors (i.e., line connectors) 35 through 40 are mounted in a manner known in the electrical art. As used hereinafter, the term "high voltage" refers to voltages in the range of about 100 volts and above, and typically will be either 110 or 220 volts provided by the power supply lines used in commercial and residential buildings.

Both the high and low voltage compartments 31 and 32 respectively, are enclosed by a cover panel 85 which fits over the top opening of control box 8 to seal the high and low voltage compartments from water and/or moisture. In order that the analyzer lights 87 of an electrical polarity and ground testing circuit 88 on main control board 27 can be viewed while cover 85 is mounted in place, an optically transparent "viewing window" 86 is provided to the cover panel 85 underneath the analyzer lights of the electrical polarity and ground testing circuit, which will be described in greater detail hereinafter. As illustrated in FIGS. 3, 5, 6, 7 and 9, electrically conducting jumper lines 45 and 46 (46') connected to the auxiliary circuit boards 25 and 26 (26') pass through access openings (notches) 47 and 48, respectively, formed in the partition 33, and establish electrical contact with the terminals of the line connectors, neutral connectors, and ground connectors as shown.

In general, the external walls of the high voltage compartment 31 of the control box 8 has access openings or apertures 50A and 50B to allow two independent high (e.g. 110) voltage power supply lines 53 and 52 respectively, to pass to the terminal board 34, for supplying electric power in general, to the pump 2, the tub water heater 18, the air blower unit 3 and control circuitry and all other operating devices. The configuration of power supply lines with respect to specific function providing operating units will be described in detail below.

Figure 5:
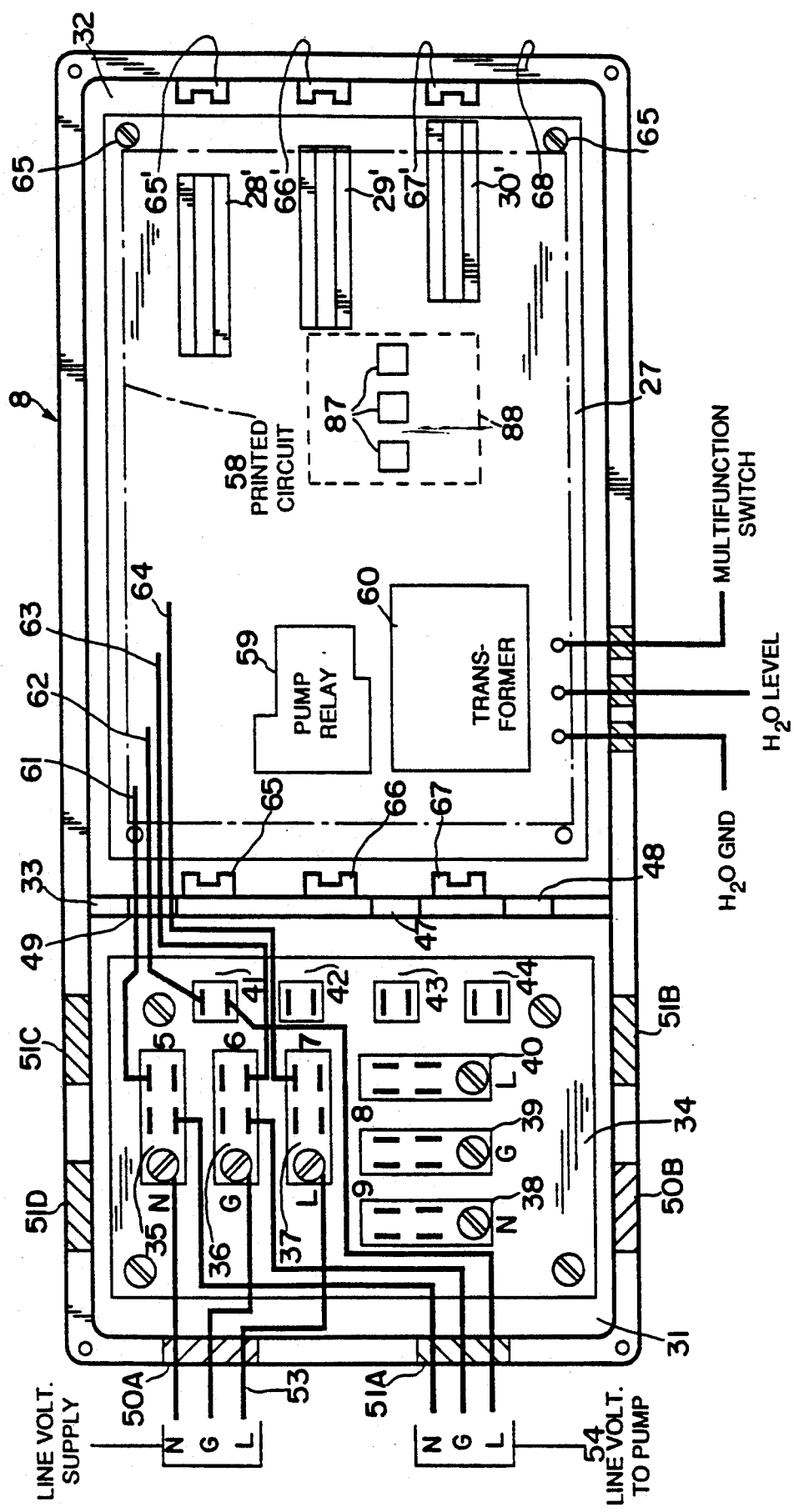
FIG. 5 is a top plan view of the unitary control box illustrating the main control circuit electrically connected to the main power source and at least one function providing operating unit.

Regardless of the auxiliary functions being provided to the jetted tub, there are always supply lines 53 which pass through aperture 50A in control box 8 and connect to terminal connectors 35, 36 and 37 on terminal board 34, and serve as input power supply for the pump 2, tub light 7, and all other timing and control functions provided by the control system 23 of the present invention. As illustrated in FIG. 5, in particular, power is provided to the pump 2 by power supply lines 54 which connect to terminal connectors 35, 36 and 41 and pass through access opening 51A in the wall of high-voltage compartment, and connect to the pump 2.

As shown in FIG. 9, when the air blower function is to be provided, power supply lines 52 pass through aperture 50B in the control box 8, and connect to the terminal connectors 38, 39 and 40 on terminal board 34. Then, power supply lines 56, connected to terminal connectors 38, 39 and 43, pass through access opening 51C in external wall of control box 8, and connect to the air blower 3.

Figure 7:
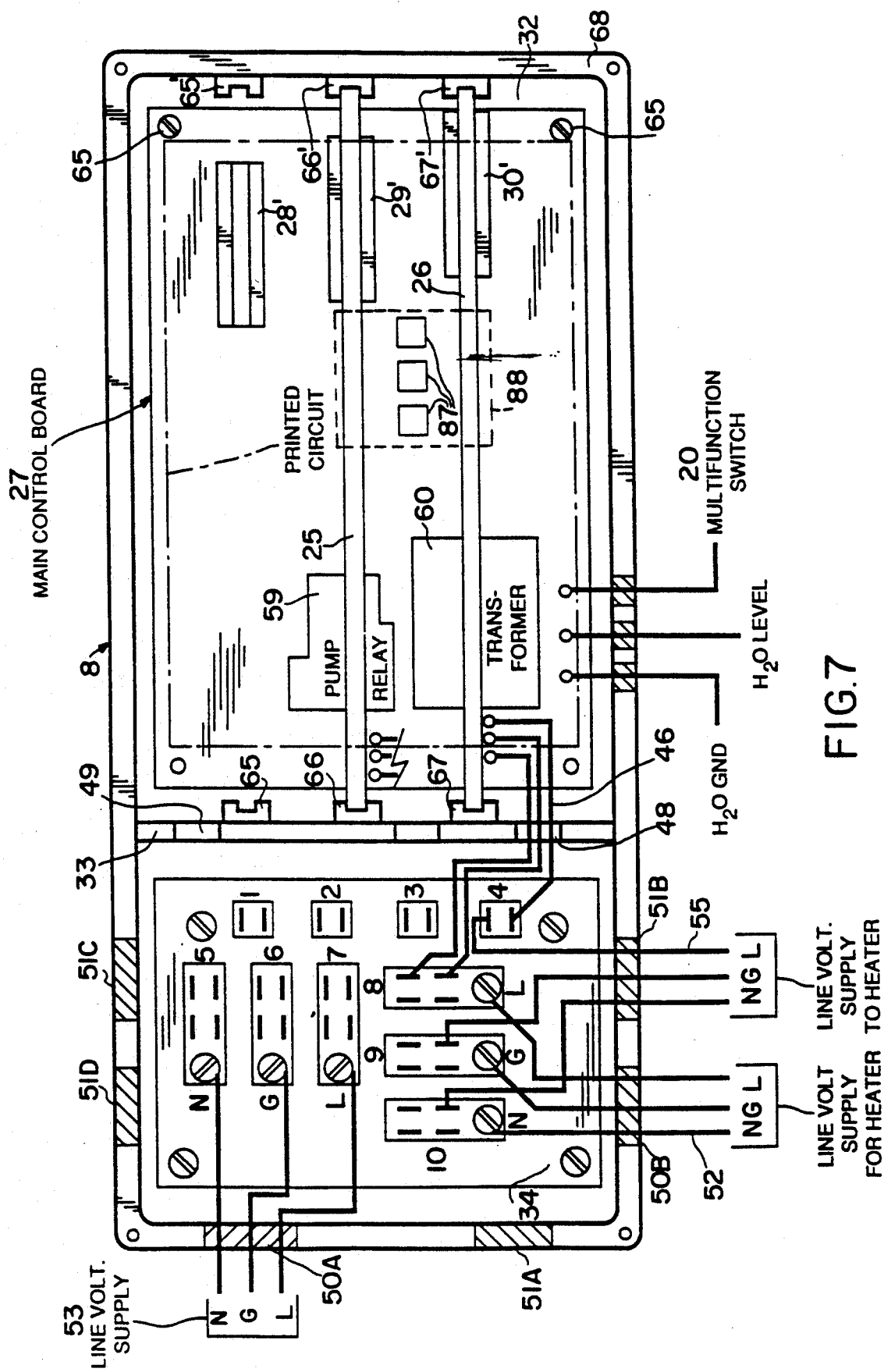
FIG. 7 is a top plan view of the unitary control box with at least one auxiliary printed circuit showing an alternate embodiment of the invention.
Figure 8:
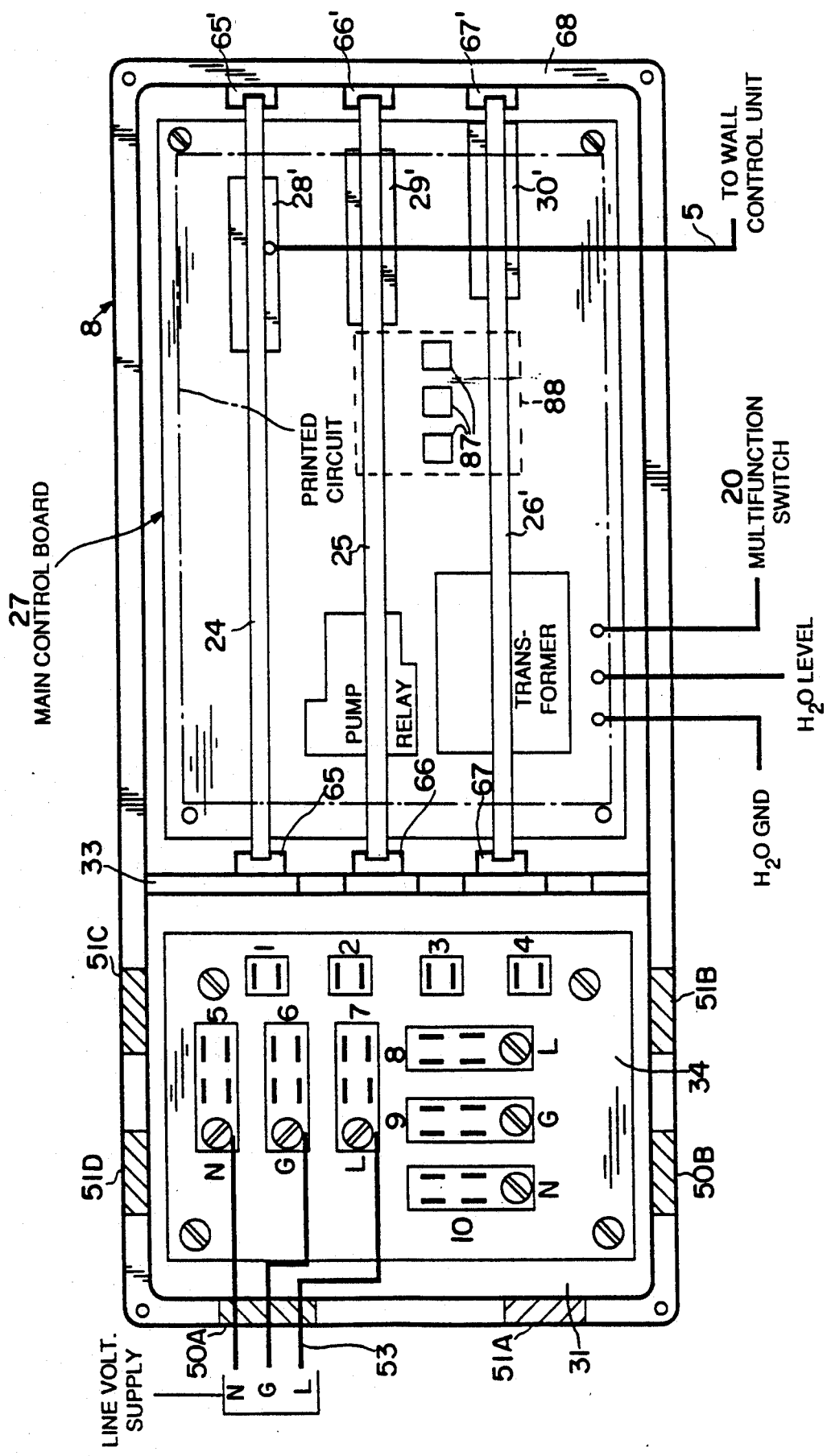
FIG. 8 is a top plan view of the unitary control box with at least one auxiliary printed circuit showing an alternate embodiment of the invention.

When on the other hand, only the heater/timer function is being provided as shown in FIG. 7, power supply lines 55 connected to terminal connectors 38, 39 and 40 pass through access opening 51B in external wall of the high-voltage compartment 31 of the control box 8 and connect tub water to the heater 18.

Figure 6:
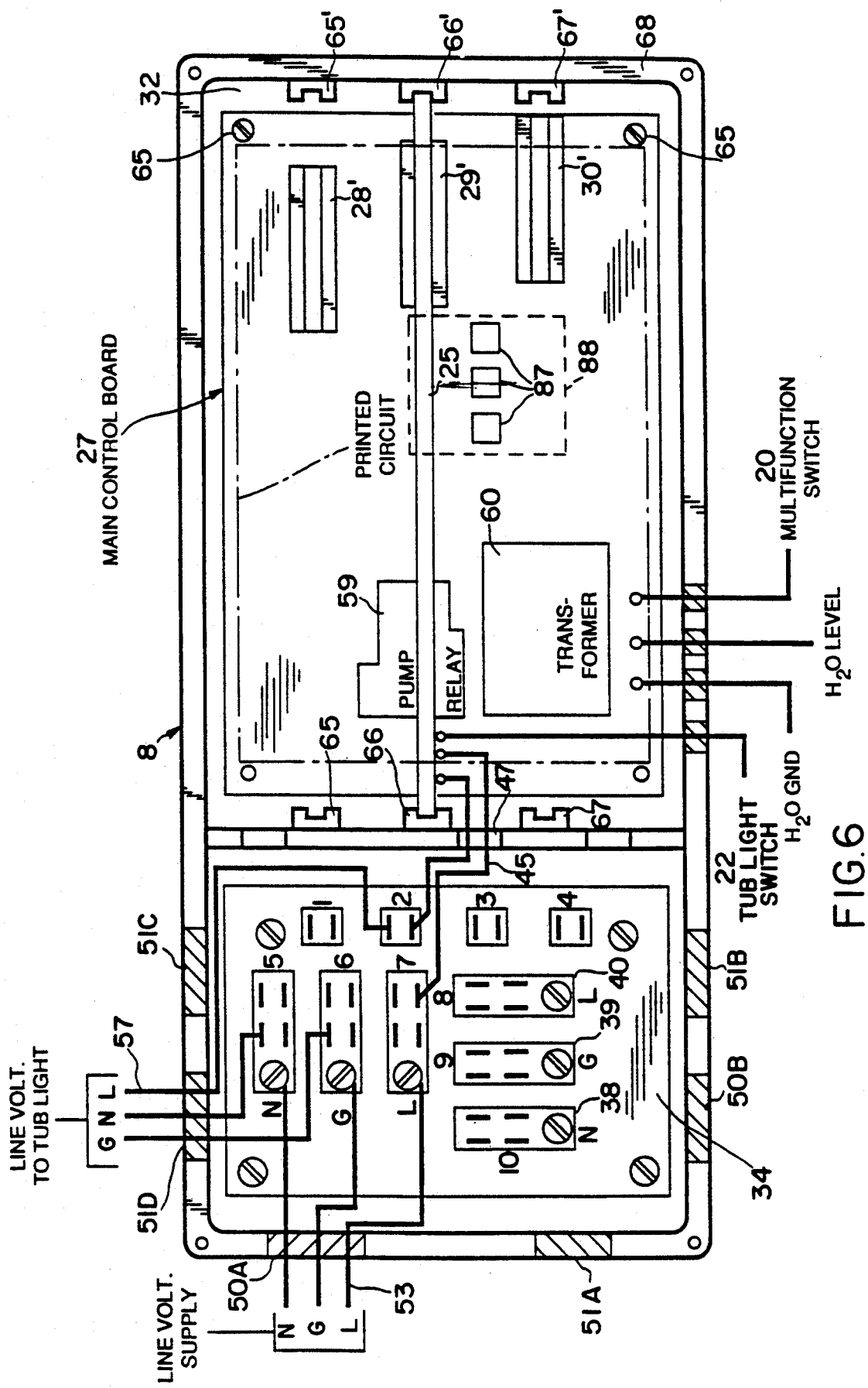
FIG. 6 is a top plan view of the unitary control box wherein at least one auxiliary printed circuit board is electrically connected to the main circuit board to provide control over a function providing operating unit for the jetted tub.

Also, when the tub water illumination function is being provided as shown in FIG. 6, power supply lines 57 connected to terminal connectors 35, 36 and 42, pass through access opening 51D in external wall of high voltage compartment 31 of the control box 8, and connect to the lamp unit of the tub illumination means 7.

In the preferred embodiment, main control board 27 shown in FIG. 5 includes a control circuit 58 of the type generally known in the art. Main or basic control circuit 58 is realized as a printed circuit having a pump relay 59, a transformer 60 and three female multipin connectors 28', 29' and 30' for interfacing up to three auxiliary circuit boards at the same time. The main control circuit 58 is electrically connected through terminal board 34, to pump 2 by way of a plurality of jumper connectors 61 through 64, in a manner illustrated in FIG. 5. Notably, by providing high voltages from the high voltage compartment 31, to the main control board 27 in the low-voltage compartment using jumper lines 45, 46, (46') and 61 through 64 passing through access openings in the partition wall 33, Underwriters Laboratories (U.L.) has been satisfied. Water level sensors 6 and 6' (including electrical ground signal) and the multi-function switch 20 are also electrically connected to the basic control circuit 58. The main control board 27 also includes an electronic regulated power supply which supplies the electronic devices components of all electronic devices of the control system 23. This power supply can be operated from either 120 or 240 VAC, at 50 or 60 Hertz.

As generally illustrated in FIGS. 4, 6, 7, 8 and 9, auxiliary circuit boards 24, 25 and 26 (26') are each adapted for being simply interfaced with the main control circuit 58 at any time by (i) simply plugging each into its respective multipin connector mounted on the main control board 27; (ii) establishing electrical connection between the auxiliary function-providing devices and the terminal board 34 using appropriate power supply lines; and (iii) installing the appropriate jumper lines from the terminal board 34 in high-voltage compartment 31 to the main control board 27 in low-voltage compartment 32. Notably, for all auxiliary control boards, electric power required to energize control circuitry thereof is supplied from the main control board 27 by way of the multipin connector interfaces.

In order that the auxiliary control boards remain perpendicularly aligned with respect to the main control board, auxiliary control boards 24, 25 and 26 (26') are slidably received in raceways or guide channels 65, 65', and 66, 66', and 67, 67', respectively, integrally formed along the inner surfaces of end wall 68 and partition 33 of low voltage compartment 32 as illustrated in FIGS. 5 and 7-9 in particular.

As illustrated in FIG. 6, deck mounted tub light switch 22 is electrically connected directly to auxiliary control board 25, while jumper lines 45 from terminal connectors 37, 42 provide supply and return lines to and from the auxiliary control board 25, respectively.

As illustrated in FIGS. 7 and 9, either auxiliary control board 26 for the tub water heater and timer function or auxiliary control board 26' for the air blower function, can be installed in the same multipin connector 30' of the main control board. Notably, when the tub water heater function is selected as an option, only then in the embodiment herein disclosed, is tub water temperature control provided.

When auxiliary control board 26 is installed for the tub water heater and timing function, jumper lines 46 are used to bring high voltage power from terminal connectors 40 and 44 to the auxiliary control board 26 while lines 55 are used to supply this controlled high voltage power to tub water heater 18, as shown in FIG. 7. On the other hand, when optional auxiliary control board 26' is installed, jumper lines 46' are used to bring high voltage power from terminal connectors 40 and 43 to auxiliary control board 26', while lines 56 are used to provide this controlled high voltage power to the air blower unit 3, as shown in FIG. 9.

Figure 3:
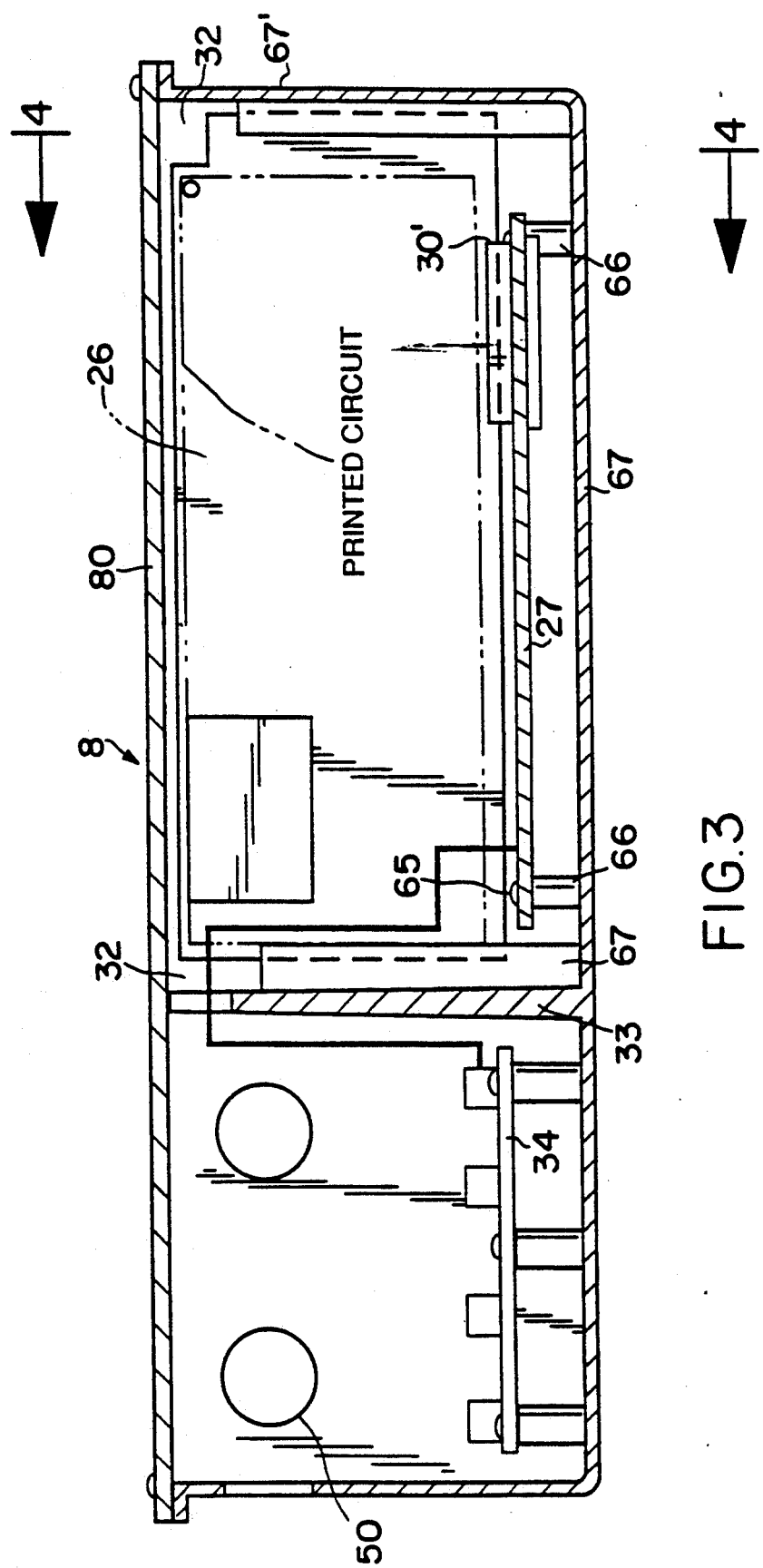
FIG. 3 is a sectional view in elevation along the axial length of the control box illustrating one of several printed circuit boards connected to the main circuit board shown in FIG. 2B.
Figure 4:
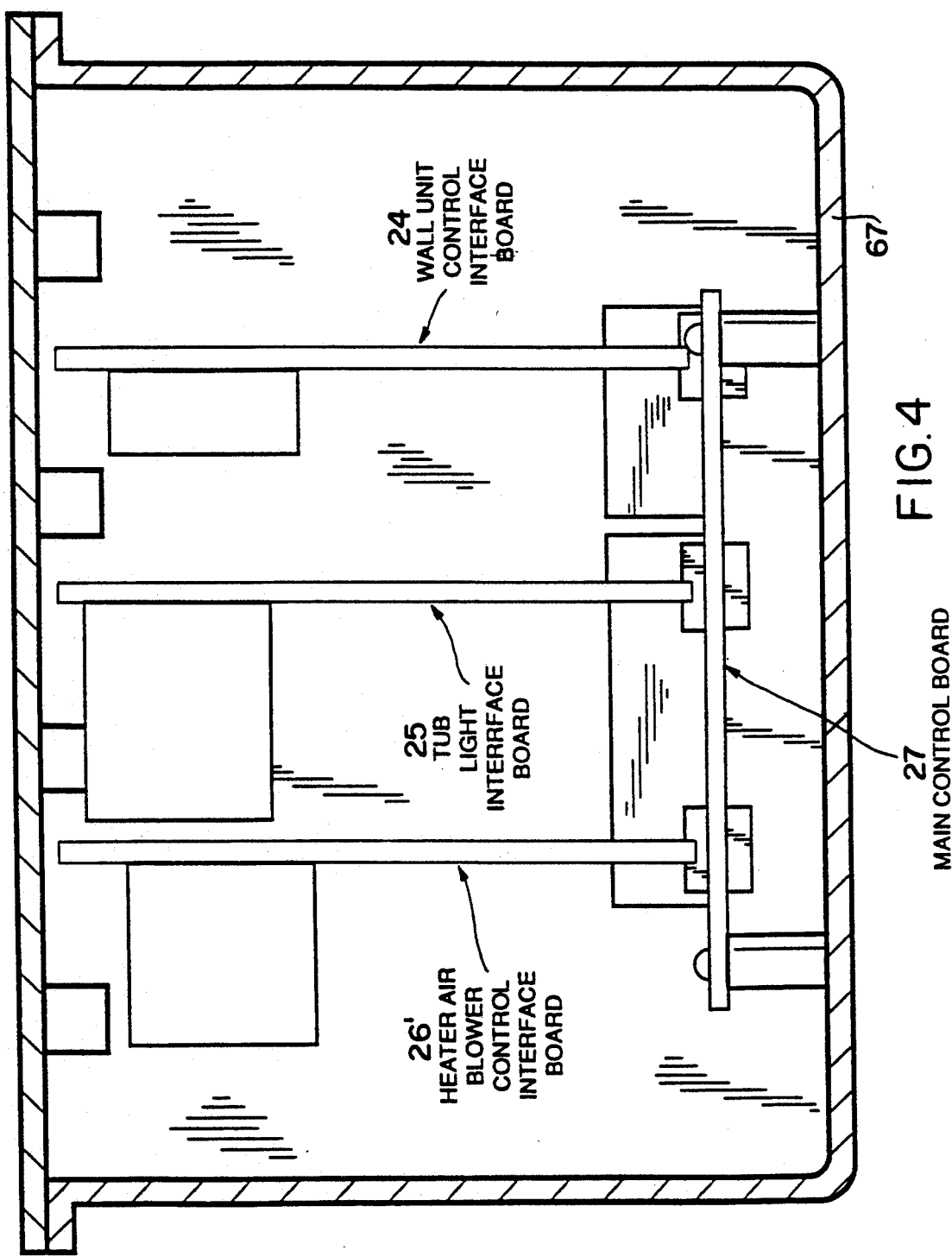
FIG. 4 is a sectional view in elevation shown along the lines 4—4 of FIG. 3.

Referring to FIGS. 3 and 4, other details regarding the physical construction of the control box 8 and circuit boards 26 and 27, will be described. Main control board 27 is removably mounted in the low-voltage compartment 32 by fasteners, such as self-tapping screws or bolts 65, in corresponding openings in studs 66 integrally formed on bottom wall 67 of unitary control box 8. In a similar fashion, high voltage terminal board 34 is removably mounted in the high voltage compartment 31, by fasteners such as self-tapping screws or bolts 65A secured in corresponding openings in studs 66A integrally formed on bottom wall 67 of the unit control box 8. Also, female multipin connectors 28', 29' and 30' are mounted on main control board 27 in a staggered relation so that printed circuit boards 24, 25, and 26 (26') can only be interfaced with the circuitry of main control board 27 with their corresponding male multipin connectors, i.e. 28, 29, and 30, respectively. In addition, each auxiliary circuit board is shaped (or notched) so as to accommodate any components mounted on main control board 27 when auxiliary control boards are received within their respective interface connectors.

The operation of each of the auxiliary circuit boards and the control system 23 in general, will now be described while referring to FIG. 2B in particular.

In FIG. 2B, there is shown an electrical schematic representation of control system 23 for operating the various function providing operating units mounted to the jetted tub 1. In the schematic representation of FIG. 2B, the various auxiliary control boards shown in FIGS. 2A and 6-9 are shown interfaced with main control board 27, and also with each of the respective function providing operating units and components shown in FIG. 1.

Function block 70 of FIG. 2B represents basic control circuit 58 illustrated in FIGS. 5 through 9. In order to provide a safety function for the pump 2, the printed control circuit 58 includes a water detection circuit 71 which receives signals from sensors 6 and 6' mounted in the walls of the tub, in order to detect the presence of water at the operating level of jetted tub. Before the pump relay 59 in the printed control circuit 58 is electrically energized to provide electrical energy to the pump to start the same, water must be of a sufficient level to submerge sensor 6. If the water level in jetted tub 1 falls below sensor 6, then there is a break in continuity between sensors which causes the pump switch circuit 72 to open, which automatically stops pump 2 from operating.

As illustrated in FIG. 2B, block 73 represents auxiliary control board 26' and includes a heater circuit which measures the initial tub water fill temperature and maintains that temperature while pump 2 of jetted tub 1 is in operation. As the water is circulated from pump 2, heater circuit will not elevate the temperature of the water above the initial fill temperature and, when not in use, will not reheat the water to its initial temperature at the time the tub was filled. Therefore, for each use of jetted tub 1, fresh water at a desired temperature must be used. The timer circuit will only allow the heater to operate for a predetermined period of time, e.g., about 30 minutes. This is a safety feature to prevent prolonged immersion of a bather's body in elevated water temperature. Also, the timer circuit is operational only for a predetermined period of time when the heater circuit is not included as part of the circuitry in heater timer board 26. The timer circuit functions to shut off pump 2 after the predetermined period of time has elapsed. This is desirable to overcome the problems that occur in commercial installations such as hotels, motels, etc., or when guests in one's home forget to turn off jetted tub 1 after use.

Remote control unit 5 is schematically represented by block 76, and is connected to auxiliary control board 77 which interfaces with main control board 27 through male and female multipin connectors 28, 28', respectively. As shown, the remote control display/control unit 5 of the preferred embodiment, includes a plurality of subcircuits, e.g., 78 through 83 mounted on a circuit board housed within the remote control unit 5 itself. Timer/Temperature Display 78 is a light emitting display which is connected to electronically measure the temperature of the water in the bathing tub (using temperature sensor 19), and to display the results of the measurement. Additional circuitry is also provided to alternately indicate the time of day based on a 12 or 24 hour format.

The Temperature Sensing Circuit 79 comprises electronic components configured to generate an electrical signal which is proportional to the thermal temperature of the bathing water. This signal is then processed and coupled to the Timer Temperature Display unit.

Time Set 80 is a circuit for carrying out a subroutine of the Time/Temperature Display 78, which permits a time interval to be programmed into the Time/Temperature Display unit, which will discontinue the control signal to the Pump Switch Circuit 72 via a Pump On/Off circuit 81.

The Pump On/Off Circuit 81, in effect, controls the Pump Switch Circuit 72 to start or stop the pump 2 from the remote control display unit 5. The Pump On/Off Circuit 81 is also coupled to the Time Set 80 circuitry to discontinue the pump's operation.

The Remote Control Unit 5 also includes an electronic timer circuit 82 which is designed to create a time interval used to delay the Time/Temperature Display operation. The output signal from this circuit delays the displaying of the water temperature.

In addition to the Timer circuit 82, an Alarm Off circuit 83 is provided, which is designed to couple a signal to the Time/Temperature Display circuit 78, which will override the audio alarm in the remote control display unit 5.

In essence, the remote control/display unit 5 permits the tub user to control all tub functions remotely, except for operation of the tub light 7, which is operable only from tub switch 22.

Heater, timer, blower board 26', or heater timer board 26 (when the air blower function is not provided), interfaces with main control board 27 through male and female multipin connectors 30, 30', and controls tub water heater unit 18 through temperature sensor 19.

While the particular embodiments shown and described above have proven to be useful in many applications involving the jetted tub arts, further modifications herein disclosed will occur to persons skilled in the art to which the present invention pertains and also such modifications are deemed to be within the scope and spirit of the present invention defined by the appended claims.

What is claimed is:

1. A jetted tub system comprising:
 a jetted tub including a tub wall and a plurality of jets mounted in said tub wall, a pump connected to said jets by a water supply line, and a return line connected to said jetted tub at a first end of said return line and to an intake side of said pump at a second end of said return line;

said jetted tub also including means, operatively associated with said jetted tub for sensing the water level;

a control box including a high voltage compartment having at least one input access opening for passing high voltage conductors therethrough and a high voltage terminal block mounted therein, said high voltage terminal block being electrically connectable to a power source and to said pump, and said water sensing means;

said control box further including a low voltage compartment having at least one access opening formed therein, and adapted for mounting at least one main control circuit board therein, and being capable of receiving low voltage conductors, said low voltage conductors being capable of carrying a signal so as to operate said pump and said water sensing means;

said low voltage compartment capable of housing one or more auxiliary circuit boards for carrying out auxiliary control functions;

a partition, integrally formed in said control box to separate said high and low voltage compartments, said partition having at least one access opening to permit the electrical connection of at least said main control circuit to said terminal block; and a cover for placement over said high and low voltage compartments.

2. The jetted tub system of claim 1 further including means, operatively associated with said jets and said water supply line, for providing a stream of air, each jet including a venturi nozzle operatively connected to said air supplying means by an air supply line; and said control box further including means, as an auxiliary control function operatively associated with said controller, for controlling the operation of said air supplying means.

3. The jetted tub system of claim 3 further including means, operatively associated with said return line line, for heating water in the return line or; and 4. The jetted tub system of claim 1 further including means, operatively associated with said return line, for heating water in the return line; and said control box further including means, as an auxiliary control function operatively associated with said control box, for controlling the water temperature.

5. The jetted tub system of claim 4 further including means, mounted in said tub wall, for illuminating water; and said said control box further including means, as an auxiliary control function operatively associated with said control box, for controlling said illumination means.

6. The jetted tub system of claim 1, further including means, mounted in said tub wall, for illuminating water; and said said control box further including means, as an auxiliary control function operatively associated with said control box, for controlling said illumination means.

7. The jetted tub system of claim 6 further including means, operatively associated with said jets and said water supply line, for providing a stream of air, each jet including a venturi nozzle operatively connected to said air supplying means by an air supply line; and said control box further including means, as an auxiliary control function operatively associated with said control box, for controlling the operation of said air supplying means.

8. The jetted tub system of claim 1, further including means, operatively associated with the jets and the water supply line, for providing a stream of air, each jet including a venturi nozzle operatively connected to the air supplying means by an air supply line;

means, operatively associated with the return line, for heating water in the return line;

means, mounted in said tub wall, for illuminating water;

said high voltage terminal block being further electrically connectable to said air supply means, said heating means, and said illumination means;

said low voltage compartment further including auxiliary circuit boards for controlling the operation of said air supply means, said heating means, and said illumination means.

* * * * *